United States Patent Office 3,444,969
Patented May 20, 1969

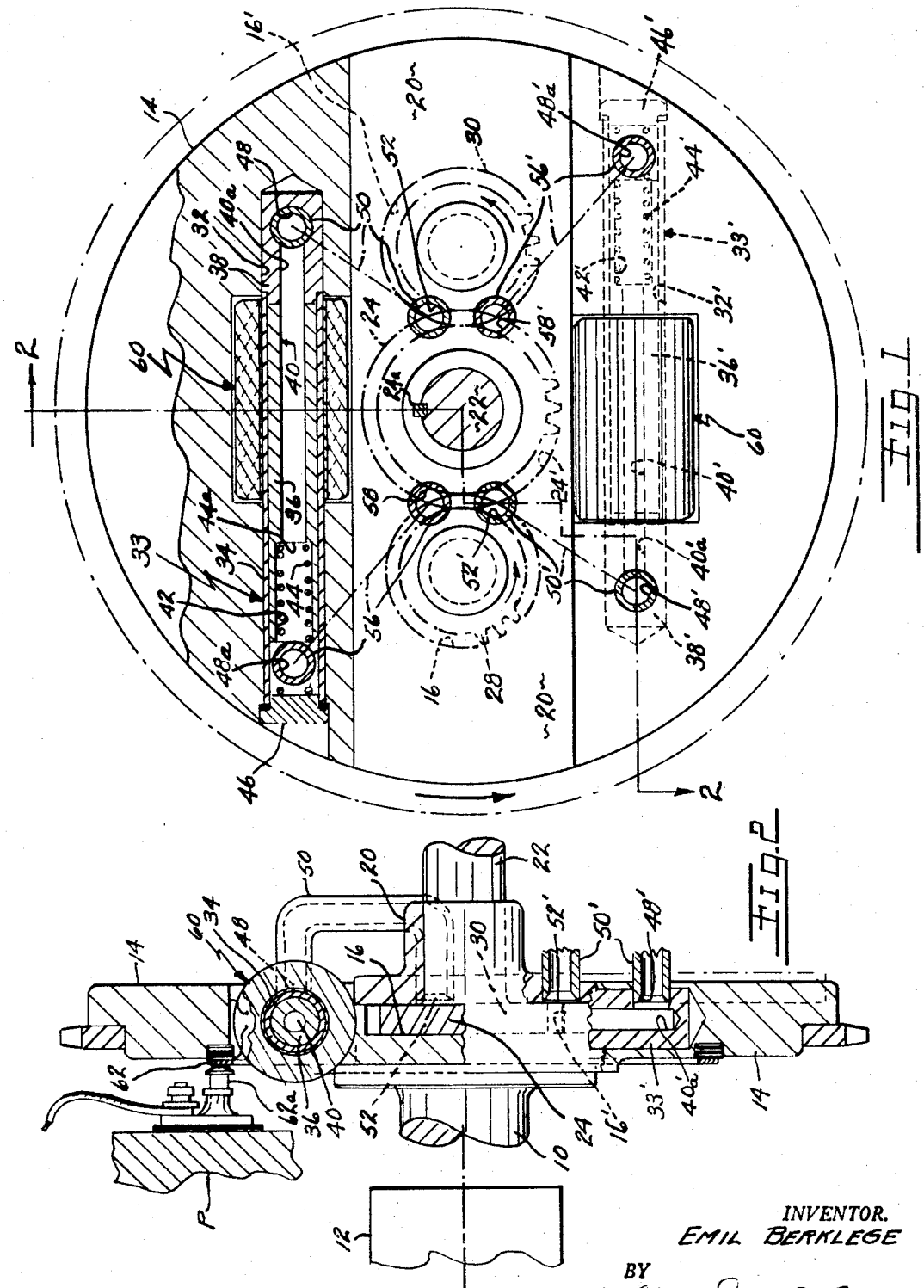

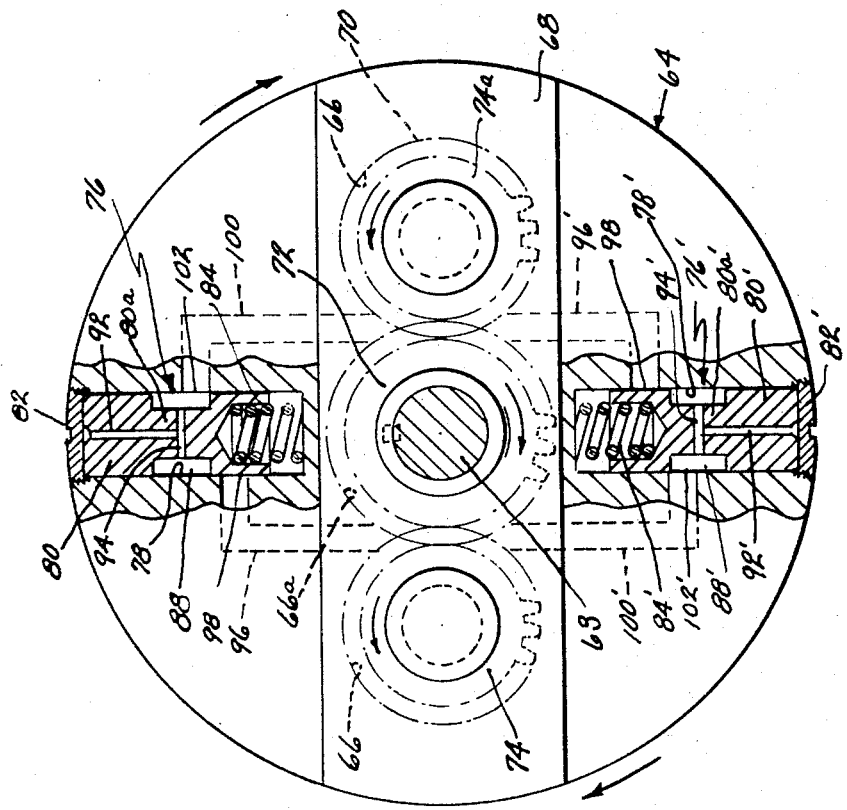

3,444,969
HYDROSTATIC POWER-LOAD COUPLING
Emil Berklege, 30209 Thomas St.,
Willowick, Ohio 44094
Filed Apr. 24, 1967, Ser. No. 633,177
Int. Cl. F16d 31/04, 23/10, 43/24
U.S. Cl. 192—61                                    4 Claims

ABSTRACT OF THE DISCLOSURE

A power-load coupling mechanism including a pressurized fluid circuit, responsive to speed, for coupling a rotary driving member to a rotary driven member. When fluid flows the driving and driven member have relative movement with respect to one another. When no fluid flows the driving and driven members rotate in unison with no relative movement with respect to one another.

The power-load coupling in one embodiment comprises a rotatable driving shaft adapted for coupling to a source of power and having a mounting plate secured thereto, and a rotary driven shaft adapted for coupling to a load, and having a sun gear attached thereto and disposed in a fluid-tight housing secured to the mounting plate of the driving shaft. Two spaced planet gears are rotatably mounted in the fluid tight housing on opposite sides of and in meshing relation with the sun gear, for rotation of the planet gears about their axes and about the sun gear upon rotation of the driving shaft and attached mounting plate. A fluid circuit is provided extending from the pressure side of the intermeshed sun and planet gears through a fluid passageway in the mounting plate and then back to the suction side of the intermeshed planet and sun gears. A spring-loaded, reciprocal-type slide valve is mounted on the mounting plate and coacts with the fluid path in the fluid circuit to automatically interrupt the flow of pressurized fluid through the path, upon predetermined rotary speed of the driving shaft and attached mounting plate, so as to automatically cut off the fluid flow in the fluid circuit and thus lock the planet and sun gears against rotation with respect to one another, thus causing rotary movement of the driven shaft with rotary movement of the driving shaft and mounting plate. A control means (in the embodiment illustrated a solenoid coil) is provided for selective actuation by an operator, to prevent the slide valve from cutting off the flow of pressurized fluid during rotation of the driving shaft and mounting plate, to thus permit high speed rotation of the latter with respect to the driven shaft without coupling the shafts together.

In another embodiment, a driven member is coupled or locked to a rotatable driving shaft member by means of the afore-discussed immobilized or locked fluid circuit arrangement including a sun gear and planet gears, but in this second embodiment there is provided a valve means which is adapted for automatic actuation upon raising of the fluid pressure in the fluid pressure circuit means to a predetermined value, which causes the valve means to open and permit circulation of fluid, thus changing the speed relation between the driving and the driven members, when the driven member is loaded by a load beyond a predetermined amount.

This invention relates in general to power-load coupling means, and more particularly a fluid coupling means for coupling a rotary driving member to a rotary driven member.

Many mechanisms are known for connecting or coupling a rotary driving member to a rotary driven member. For instance, friction clutches, hydraulic clutches, friction drums, drive pins and many other mechanisms are conventionally utilized to accomplish this purpose.

The present invention provides a novel power-load coupling mechanism which includes a pressurized fluid circuit for coupling a rotary driving member to a rotary driven member, and wherein means is provided for controlling the flow of fluid through the pressurized fluid circuit, to thus control the coupling of the driven member to the driving member. When fluid flows through the pressurized fluid circuit, the driving and driven members have relative movement with respect to one another. When no fluid flows through the fluid circuit, then the driving and driven members rotate in unison with no relative movement with respect to one another.

Accordingly, an object of the invention is to provide a novel power-load coupling means which utilizes a pressurized fluid circuit for coupling the driving and driven members together for rotation.

Another object of the invention is to provide a power-load coupling in accordance with the above wherein means is provided for automatically interrupting flow of pressurized fluid through the pressurized fluid circuit upon predetermined rotary speed of the driving member with respect to the driven member, to automatically couple the driven member to the driving member by immobilizing fluid pressure producing means in the fluid circuit.

A further object of the invention is to provide a power-load coupling in accordance with the above wherein means is provided for selectively preventing actuation of the automatic interrupting means, thereby permitting high speed rotation of the driving member with respect to the driven member, without coupling occurring between the driving and driven members.

Another object of the invention is to provide a power-load coupling in accordance with the above wherein the rotary force from the driving member is applied to the driven member in a more efficiently and less shock-producing manner than heretofore possible with couplings previously known.

Other objects and advantages of the invention will be apparent from the following description taken in conjunction with the accompanying drawings, wherein:

FIGURE 1 is a partially sectioned, end elevational view of a power-load coupling embodying the present invention;

FIGURE 2 is a sectional view taken generally along the plane of line 2—2 of FIGURE 1, looking in the direction of the arrows;

FIGURE 3 is a partially sectioned, end elevational view of a modified embodiment of power-load coupling;

FIGURE 4 is a partially sectioned, side elevational view of the FIGURE 3 coupling.

Referring now again to FIGURES 1 and 2 of the drawings, the power-load coupling mechanism may comprise a rotary driving shaft 10 which may be secured to or otherwise connected to a power source (diagrammatically illustrated at 12) such as for instance an internal combustion engine, or any other source of power, for causing rotation of shaft 10. Secured to shaft 10 there may be a mounting plate or member 14 which is adapted for rotation with the shaft.

Mounting plate 14 may have recesses 16, 16' provided therein with the recesses being adapted to be enclosed by a cover or housing member 20 which in conjunction with recesses 16, 16' defines a fluid pressure chamber therein. Conventional sealing means can be provided coacting between the cover 20 and the mounting plate 14 to provide a fluid-tight arrangement. Extending through the side of the cover 20 in axially aligned relation with shaft 10 there may be provided a driven rotary shaft member 22.

A sun gear 24 may be fixed as at 24a to the driven shaft 22, with the sun gear being disposed in the chamber defined by the cover 20 and a recess 24' communicating with recesses 16 and 16' in the mounting plate 14. A pair of rotary planet gears 28, 30 which may be journalled on plate 14 and cover 20 are intermeshed with the sun gear 24 in the fluid containing chamber. Gears 24, 28 and 30 provide pressurized fluid producing means for causing circulation of fluid through a fluid circuit, as will be hereinafter described.

It will be seen that with the parts of the mechanism in the position illustrated in FIG. 2, if a load is placed upon shaft 22, the planet gears 28 upon the rotation of driven shaft 10 and mounting plate 14, merely rotate about their axes as they rotate about the sun gear 24 with the rotation of the mounting plate.

Bores or recesses 32 and 32' may be provided on opposite sides of the recesses 16, 16' in the mounting plate, with such recesses housing valve mechanisms 33 and 33' respectively. Since the valve mechanism 33, 33' and associated fluid circuit means are identical, only one will be described in detail with the corresponding parts of the other being designated by like numbers with the suffix "prime" added thereto. Valve mechanism 33 may comprise a sleeve member 34 mounted in recess 32 and in which is reciprocally mounted a plunger member 36. It will be noted that valve mechanisms 33 and 33' are parallel to a common diameter through gears 24, 28 and 30. One end of the recess may also be provided with an abutment 38 which coacts with the sleeve member 34 and limits the inward movement of the plunger 36. As can be seen in FIGURE 1, plunger 36 has a lengthwise extending passageway 40 extending completely therethrough, and which is adapted for alignment with passageway 40a disposed in the abutment member 38. An enlarged counterbore portion 42 in the sleeve member 36 provides for a spring member 44 which is disposed between the shoulder 44a on the plunger member, and a preferably removable cap member 46 which seals the outer end of the sleeve 34. Suitable sealing means may be provided between the cap member 46 and the sleeve 34 so as to prevent the egress of fluid therefrom.

It will be seen that the plunger members 36 and 36' move outwardly with respect to the associated sleeve member 34 and 34' and away from the coacting abutment 38 and 38', against the resistance to compression of the spring member 44 and 44' upon predetermined rotational speed of mounting member 14.

A port 48 may be provided in the abutment member 38 with such port member communicating by means of tubing or fluid transmission line 50 (FIGURES 1 and 2) to a port 52 in housing member 20, which port 52 communicates with chamber 16, 16' in the mounting member 14 in the area where the teeth of planet gear 30 mesh with the teeth of sun gear 24.

Likewise a port 48a is provided in the sleeve 34 adjacent the outer end of the sleeve, and which port is normally in open condition when the plunger is disposed in the position illustrated in FIGURE 1. Port 48a may be coupled via tubing or fluid transmission line 56 to port 58 (FIG. 1) communicating with the chamber 16, 16' in the area of meshing relationship between the planet gear 28 and the sun gear 24. Port 52 is the pressure port of the fluid circuit, while port 58 is the suction port, assuming rotation of the mounting member 14 in the direction indicated. The other fluid control valve 33' likewise has a similar arrangement of ports and fluid transmission means forming a fluid circuit, which are identified by similar numbers with the suffix prime added thereto as aforementioned.

In operation, rotation of the shaft 10 may cause rotary movement of the mounting plate 14 in the direction of the full line arrow and rotation of attached planet gears 28, 30, and associated fluid flow valve means 33, 33'. When the shaft 10 and attached mounting plate 14 are at zero r.p.m. or relatively low r.p.m., the plunger members 36, 36' are maintained in the positions illustrated in FIGURE 1 due to the action of the associated spring member 44, 44'. which urge the plungers against the associated abutment member 38 or 38', thus maintaining the port members 48a and 48a' open, permitting the flow of fluid from the ports 52, 52' through passageway portions 40a, 40a' in the abutment members and passageways 40, 40' in the plunger members, and back out the port members 48a, 48a' to the respective suction port 58, 58'. However, after a predetermined r.p.m. or speed of the driving shaft 10 and attached mounting plate 14 is reached, the centrifugal force of rotation automatically forces the plunger members 36, 36' outwardly against resistance of the associated springs 44, 44' to seal off the ports 48a, 48a' at which time fluid flow through the fluid circuits including plungers 36, 36' and associated passageways 50, 50', 56 and 56' is prevented. Since the hydraulic fluid then cannot flow from the pressure ports 52, 52' of the fluid pressurizing means, the latter (e.g. gears 24, 28 and 30) are locked against relative movement with respect to one another by the columns of fluid in the fluid circuits including lines 50, 50', 56 and 56'. Accordingly, the sun gear 24 is caused to rotate with the mounting member 14 and driving shaft 10 thus causing rotation of the driven shaft 22.

In the normal operating r.p.m. of an internal combustion engine, for instance as used in motor vehicles, the speed of the crank shaft is generally above 500 r.p.m. Therefore, the springs 44, 44' could be so set, if the power-load coupling mechanism is utilized with an internal combustion engine, so that at speeds of the driving shaft 10 and mounting plate 14 above 500 r.p.m., the plungers 36, 36' would move outwardly with respect to their respective sleeves, to thereby close the associated port 48a or 48a'.

Now in order to provide for selectively controlling the movement of the fluid control valve means 33, 33' other than that as provided by control of the speed of rotation of the driving shaft member 10 and mounting plate 14, there may be provided means 60 coacting with the valve means 33, 33' for selectively preventing the plungers from moving outwardly to close their associated ports irrespective of the speed of rotation of the mounting plate and associated driving shaft. In the embodiment illustrated this means comprises electrically actuated solenoid coils which when actuated by the operator would hold the plungers 36, 36' in the position illustrated in FIGURE 1, irrespective of the speed of rotation of the driving shaft 10, and thereby prevent closure of the ports 48a, 48a'. This will permit the fluid to flow from the fluid pressurizing means comprising the planet and sun gears 24, 28 and 30 through the fluid circuits defined by the fluid transmission lines 50, 50', 56 and 56' and the passageways 40, 40' through the plungers, irrespective of the speed of rotation of the driving shaft and mounting plate. In a single line electric system, one of the coil's terminals may be grounded to an adjacent metallic surface on the mounting plate while the other terminal may be connected to a collector ring 62 (FIG. 2) mounted on the mounting plate 14. An electrical feeder 62a mounted on an adjacent stationary surface or part P may coact in sliding engaged relation with the collector ring 62, for furnishing current to coils 60.

Referring now to FIGURES 3 and 4 there is illustrated another embodiment of power-load coupling device, wherein a driving shaft member 63 adapted for coupling to a source of power, has a driven member 64 rotatably mounted thereon as by bearing means 64a. Member 64 is adapted for coupling to a load, and is coupled to the driving member 63 by a fluid circuit arrangement somewhat similar to that of the first described embodiment. Driven member 64 which in the embodiment illustrated is of disc-like shape, has circular recesses 66 and 66a formed therein, and enclosed by a cover 68 which defines in conjunction with recesses 66, 66a a leak-proof chamber 70, in which is disposed sun gear 72. Cover 68 may be maintained in place by any suitable means. Sun gear 72 is fixed to driving shaft 63 in recess 66a and therefore rotates with the shaft. As can be seen from FIG. 4, shaft 63 extends through member 64. Rotatably mounted in recesses 66 and coacting in meshing relation with sun gear 72 are spaced planet gears 74, 74a.

Also mounted in the driven plate member 64 is a reciprocal fluid flow control valve mechanism 76 which operates in a bore or cavity 78 formed inwardly from the edge of plate member 64. A reciprocal plunger member 80 of the valve mechanism is disposed in the bore 78 and is held against leak-proof, removable cap 82 as by means of spring 84. Plunger 80 is provided with reduced size central portion 80a defining an area 88 in the bore 78. A passageway or drilled hole 92 may be provided extending from the exterior of the outer end of the plunger and communicating with cross-passageway 94 passing transversely through the reduced size section 80a and communicating with bore portion 88. Fluid passageway 96 may be provided extending into chamber 70 and from the suction side of the coacting sun and planet gears 72 and 74, and which communicates at port 98 with the bore 78.

Passageway 100 extending from the pressure side of planet and sun gears 72 and 74a, extends through the mounting or driven plate member 64 to communicate at port 102 with portion 88 of the bore 78. A similar arrangement of flow control valve mechanism 76' may be provided on the opposite side of the driven plate 64 with the parts thereof designated by similar numbers but with prefix prime added thereto.

It will be seen that in the position of the valve members 80, 80' as shown in FIGURE 3, and with the passageways 96, 96', 100 and 100' filled with fluid, such as hydraulic oil, the plunger members 80, 80' block the flow of fluid through the fluid circuits and from the pressure sides of the coacting sun and planet gears, and thus the sun gear is locked with respect to the planet gears by the immobilized columns of fluid in the fluid circuits. Since the planet gear is secured to the driving shaft 63, driven plate 64 when under no load rotates with the driving shaft 63.

However, when the resistance to turning of member 64 due to the load places a predetermined pressure on the fluid in passageways 96, 96', 100, 100', then sufficient pressure is applied by the fluid in the circuits against plungers 80, 80' to force the latter in the direction of the opposing springs 84, 84' to cause the plungers to be displaced inwardly, thereby communicating the fluid passageways 96, 96' with the portions 88, 88' of the respective bore 78, 78' and thus communicating passageway 96 with passageway 100 and passageway 96' with passageway 100' permitting fluid to flow through the circuits from the pressure side to the suction side. Consequently, said circulation of pressurized fluid through passageways 96, 96' 100, 100' will result in a lag in the rotation of the driving plate 64 causing the latter to eventually stall, while the driving shaft 63 will continue to run. It will be seen that the passages 92, 94, 92', 94' and the resistance to compression of the associated springs 84, 84' can be so arranged as to provide for circulation of the fluid through the power-load coupling as desired for predetermined loading of driven member 64.

From the aforegoing description and accompanying drawings, it will be seen that the invention provides a power-load coupling comprising a rotatable driving member and a rotatable driven member with fluid circuit means coacting between the members for coupling the driving member to the driven member, together with means in one embodiment for interrupting the circulation of the fluid upon predetermined rotary speed of the driving member to couple the driving and driven members together to cause rotation thereof.

I claim:

1. A power-load coupling comprising a rotatable driving member adapted for coupling to a source of power, a rotatable driven member adapted for coupling to a load, a sun gear fixed to said driven member, a mounting plate secured to said driving member for rotation therewith, a pair of diametrically opposed planet gears mounted on said plate for rotation about their respective axes and in mesh with said sun gear, means for enclosing the intermeshing zones of said sun and planet gears to provide first and second pressure chambers on opposite sides of said sun gear, there being a high pressure port and a low pressure port communicating with each of said pressure chambers, two valve mechanisms respectively on opposite sides of and generally parallel to a common diameter through said gears, each valve mechanism comprising an elongated sleeve fixed on said plate and an elongated hollow plunger reciprocatable in its associated sleeve, there being a high pressure port at one end of each mechanism communicating with the hollow of its associated plunger and a low pressure port opening through said sleeve at the other end of each mechanism and adapted to be opened and closed by plunger reciprocation, a spring in each mechanism biasing its associated plunger to open said low pressure port, said valve mechanisms having their high pressure ports respectively at oppositely directed ends, flow passageways connecting the high pressure port of each of said pressure chambers with the nearest high pressure port of the adjacent valve mechanisms, and flow passageways connecting the low pressure port of each of said pressure chambers with the nearest low pressure port of the adjacent valve mechanisms, whereby when said pressure chambers and valve mechanisms and flow passageways are filled with hydraulic fluid and when the rotation of said mounting plate produces a predetermined centrifugal force acting upon said plunger to overcome the urging of their associated springs then said plunger will move to close their associated low pressure ports causing a locking action where said sun gear and planet gears intermesh to cause rotation of said driven member with rotation of said driving member.

2. A power-load coupling as defined in claim 1 including means for causing said plunger to open their associated low pressure ports irrespective of the rotary speed of said driving member.

3. A power-load coupling in accordance with claim 1 wherein said valve mechanism comprises headed end portions and a reduced-size central portion and passageway means extending transversely through said central portion and axially of said valve into communication with the exterior of one head portion.

4. A power-load coupling in accordance with claim 3 wherein one headed end portion of said valve mechanism seals said low pressure port while said high pressure port communicates with said reduced-size central portion.

References Cited

UNITED STATES PATENTS

| 1,688,852 | 10/1928 | Christie | 192—61 |
| 2,174,344 | 9/1939 | Sinderson | 192—61 |
| 2,377,350 | 6/1945 | Marsh | 192—61 |
| 2,435,244 | 2/1948 | Stephens | 192—61 |
| 2,498,733 | 2/1950 | Boxer | 192—61 |
| 2,502,092 | 3/1950 | Jessup | 192—61 |
| 2,564,848 | 8/1951 | Jessup | 192—61 X |
| 2,718,758 | 9/1955 | Minshall et al. | 192—61 |
| 2,974,767 | 3/1961 | Fulton | 192—61 X |
| 3,258,093 | 6/1966 | Ahlen | 192—61 |
| 3,156,257 | 11/1964 | Strader | 137—494 |

CARLTON R. CROYLE, *Primary Examiner.*

ALLAN D. HERRMANN, *Assistant Examiner.*

U.S. Cl. X.R.

192—105